Aug. 17, 1965  A. A. DROS  3,200,602
HOT-GAS RECIPROCATING MACHINE
Filed Aug. 1, 1963  2 Sheets-Sheet 1

INVENTOR.
ALBERT A. DROS
BY
Frank R. Trifari
AGENT

INVENTOR.
ALBERT A. DROS
BY
Frank R. Trifari
AGENT

United States Patent Office 3,200,602
Patented Aug. 17, 1965

3,200,602
HOT-GAS RECIPROCATING MACHINE
Albert August Dros, Emmasingel, Eindhoven, Netherlands, assignor to North American Philips Company, Inc., New York, N.Y., a corporation of Delaware
Filed Aug. 1, 1963, Ser. No. 299,347
Claims priority, application Netherlands, Aug. 7, 1962, 281,835
11 Claims. (Cl. 62—6)

The invention relates to a hot-gas reciprocating machine. The machine comprises one or more compression spaces of variable volume communicating with one or more expansion spaces also of variable volume, said spaces having, in operation of the machine, relatively different mean temperatures, while the spaces are in communication with one another by means of regenerators through which a medium can pass going to said spaces. The machine comprises piston-like bodies movable with a phase difference for varying the volumes of the expansion space and the compression space, said piston-like bodies being coupled with a driving gear. The hot-gas reciprocating machine constructed in accordance with the invention is particularly suitable for use as a cold-gas refrigerator.

In known machines of the type hereinabove set forth the piston-like bodies which vary the volumes of the compression space and of the expansion space, are connected through piston rods, connecting rods, yokes, gear wheels and the like with the driving gear. The structure of the driving gear is complicated in this machine especially by the 90° phase difference in the movements of the piston-like bodies required for a satisfactory operation of said machines. This has involved hitherto complicated constructions comprising many points of rotation subject to wear. In addition, all these constructions comprise a great number of the aforesaid component parts.

The invention has for its object to overcome the aforesaid disadvantages and has as a principal feature the coupling of the driving gear with at least one of the piston-like bodies being formed by one or more fluid columns movable in ducts and capable of transferring power from the driving gear to the relevant piston-like body or conversely.

This provides a very simple coupling between the driving gear and the relevant piston, while without the use of complicated mechanisms the desired phase difference between the relevant piston-like bodies can be obtained. Within the scope of the present invention the term "coupling" is to denote not only a fixed connection between the pistons and the driving gear, but also a means for controlling the movement of the piston in accordance with the movement of the driving gear or conversely.

An advantage of the coupling according to the invention consists in that in practice there is a great freedom in the disposition of the driving gear and of the piston-like bodies of the cycle relatively to each other.

Although it is possible to couple the piston-like bodies of the thermo-dynamic machine through fluid columns with the driving gear, it may be advantageous to couple only that piston-like body which transfers the lowest power through a fluid column with the driving gear.

An advantageous embodiment of the thermo-dynamic reciprocating machine according to the invention is that the piston-like body capable of varying the space having, in operation, the higher mean temperature, is linked by mechanical agency to the driving gear and the piston-like body capable of varying the space having, in operation, the lower mean temperature, is coupled through a movable fluid column with said driving gear. The piston-like body capable of varying the volume of the space has, in operation, the lower mean temperature which requires with these machines always lower power than the piston-like body capable of varying the volume of the space having, in operation, the higher mean temperature. Consequently, the present invention applies not only to a hot-gas engine but also to a cold-gas refrigerator.

A further object of the hot-gas reciprocating machine embodying the invention is that the machine comprises two piston-like bodies moving with phase difference and having their center lines coinciding and in that the compression and the expansion space are located between the opposite faces of said piston-like bodies, while at least the piston-like body bounding the space having, in operation, the lower mean temperature is adjacent by at least one face connected to said piston-like body to a movable fluid column establishing the coupling between this piston-like body and the driving gear.

It should be noted that the arrangement of the compression piston and the expansion piston in line with the compression space, with the regenerator and the expansion space in between them is known. Although this disposition is particularly useful for the flow of the medium, since the medium is capable of following the shortest path along straight ways so that it need not be diverted, this arrangement can, in practice be carried out only with difficulty with the conventional means, with a view to the complicated structure of the driving gear required for the desired piston movements. The coupling between driving gear and pistons according to the invention completely overcomes the said disadvantage.

Another object of the present invention is that the hot-gas reciprocating machine comprises a structure in which at least the piston-like body bounding the space having, in operation, the lower mean temperature is connected with a face remote from said space and adjacent a movable fluid column, establishing the coupling between the piston-like body and the driving gear. In this embodiment the side of the piston remote from the working space may be subjected to a pressure prevailing in the space on the side of the piston which is lower than the pressure in the cycle, consequently the gas pressure in the cycle always ensures a permanent contact between the face bounding the movable fluid column and the fluid.

A further advantageous embodiment of the thermodynamic reciprocating machine according to the invention has the feature that at least the piston-like body bounding the space having, in operation, the lower mean temperature is provided on its side remote from said space with a piston rod which supports a piston-like body movable in a closed cylinder. Each face of the piston-like body is in contact with a fluid column establishing the coupling between the body and the driving gear. The faces of the movable piston-like body bounding the fluid column may in this case be smaller than the surface of the piston-like body connected herewith. Thus, smaller quantities of fluid will suffice in the machine than in the case in which the relevant piston-like body itself bounds the fluid column. A further advantage of this embodiment consists in that the piston bounding the working space can be governed in this case in both directions by the fluid columns.

A further thermo-dynamic reciprocating machine embodying the invention is characterized in that it comprises two pump units arranged in the form of a V, each unit comprising one or more interconnected pistons, each of which is capable, at least by one side, of varying the volume of a fluid-filled space, the machine comprising furthermore at least one unit in which the thermo-dynamic cycle is performed and which comprises a compression piston movable in a cyliner, a cooler, a regenerator, a freezer or heater and an expansion piston movable in a cylinder space, the components of each unit being arranged in line with each other, while the space of each unit on the side remote from the working space of the expansion piston associated with said unit communicates with a space acted upon by a piston of the first pump unit, whereas the space on the side of the compression piston of said unit remote from the working space communicates with a space affected by a piston of the second pump unit. The pistons provided in the pump units may be single-acting or double-acting pistons.

A further embodiment of the thermo-dynamic reciprocating machine according to the invention has the feature that the center lines of the pump units arranged in the form of a V are at an angle of approximately 90° to each other, while the pistons provided in said pump units are mechanically linked to the same cranks of a crank shaft or to the cranks lying in the same plane and extending in the same direction. Thus, a compact machine is obtained.

A further thermo-dynamic reciprocating machine embodying the invention is characterized in that the side of the piston remote from the space having, in operation, the higher mean temperature, which piston bounds said space, is mechanically linked to a crank shaft, which is furthermore mechanically connected with a further piston-like body so that the two piston-like bodies are movable with a phase difference, said further piston-like body being movable in a cylinder, while one of the two spaces on either side of said piston-like body are completely filled with fluid and the piston-like body which bounds the space having, in operation, the lower mean temperature, is connected with a further piston-like body also movable in a cylinder, the space or both spaces on either side of said body being completely filled with fluid, while the fluid-filled spaces of one cylinder and those of the other cylinder communicate with each other.

In a further embodiment of the thermo-dynamic reciprocating machine according to the invention there are provided two units arranged in the form of a V and comprising each a movable compression piston and a movable expansion piston, while between each pair of said pistons the associated compression space, the regenerator and the expansion space are arranged, each compression piston and each expansion piston being connected with a piston-like body movable in a closed cylinder, while at least one of the spaces on either side of each further piston-like body is filled with fluid and the piston bounding the space having, in operation, the higher mean temperature, in each unit is mechanically linked to a common crank shaft and each of the fluid-filled spaces on either side of the further piston-like bodies connected with one of the pistons bounding the spaces of each unit having, in operation, the higher mean temperature, communicates with one of the fluid-filled spaces on either side of the piston-like body connected with the piston bounding the space having the lower temperature in the other unit. Thus, a simple structure provided a compact, rugged construction of a two-cylinder thermo-dynamic reciprocating machine.

Although the above-mentioned coupling between pistons and driving gear by means of a fluid column may be effectively employed in hot-gas reciprocating machines, in which the cooler, the regenerator, the freezer or the heater are arranged between the opposite faces of the compression piston and the expansion piston, said coupling may also be used with other kinds of hot-gas reciprocating engines. In one such embodiment a hot-gas reciprocating machine according to the invention has the feature that it comprises two units arranged in the form of a V, each comprising a movable compression piston and a movable expansion piston, the center lines of which coincide, while the faces of each pair of associated compression pistons and expansion pistons which faces are capable of varying the volumes of the compression space and of the expansion space respectively, are oriented in the same direction and the piston having the higher mean temperature in each unit is mechanically coupled with a common crank shaft, each of the pistons having the higher mean temperature being provided with two portions of different diameters, said portions being adapted to reciprocate each in an associated cylinder space and the volume variations of the spaces affected by the annular surface formed by the transition of the two portions of one piston having the higher mean temperature are in phase with the volume variations of the space of said unit with the higher mean temperature, while the volume variations of the space affected by the annular surface formed by the transition of the two portions of the other piston having the higher mean temperature are in phase opposition to the volume variations of the space in said unit with the higher mean temperature, while the spaces affected by the said annular surfaces are completely filled with fluid and each of said spaces communicates with a cyilnder space which is closed at the upper end by the piston having the lower mean temperature in the other unit. The rhombic driving gear hitherto used for the embodiment of such a hot-gas reciprocating machine is here replaced by a conventional connecting-rod mechanism which drives the piston of the higher mean temperature and a fluid column which couples the piston of the lower mean temperature with the driving gear. Consequently, the disadvantage of the expansion piston rod being taken through the compression piston is also overcome.

A further object of the present invention is to provide a machine embodying the invention in which the seal between the fluid spaces in the machine and the expansion spaces and compression spaces respectively is formed by rolling diaphragms. Thus, leakage of fluid towards the working space is avoided, although comparatively large volumes of compressed fluid are available in the machine.

It will be obvious that piston-like bodies referred to above, capable of varying the volumes of the compression space and of the expansion space also include pistons, plungers, and even end faces of bellows, by means of which the volumes of the spaces in the bellows can be varied.

The invention will be described more fully with reference to the drawing, which is given by way of example.

Figure 1:
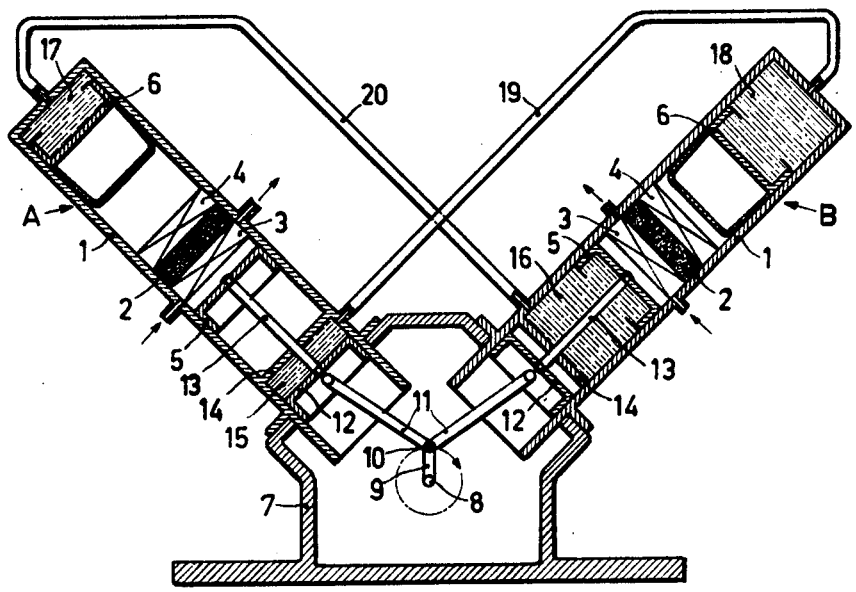
FIGS. 1, 2 and 3 are partly sectional and partly side elevational views of different embodiments of hot-gas reciprocating machines, which are shown in the form of cold-gas refrigerators for clarity, in which two units in which the thermodynamic cycle is performed, are disposed in the form of a V on a machine substructure.

Corresponding parts are designated by the same reference numerals in the figures and FIG. 1 shows one embodiment of a cold-gas refrigerator, in which two units A and B are disposed in the form of a V on a machine frame 7, each unit comprising a cylinder 1 with an incorporated regenerator 2, a cooler 3, a freezer 4, a compression piston 5 and an expansion piston 6. The machine frame 7 comprises a crank shaft 8, which is coupled to a driving gear (not shown). The crank shaft 8 is provided with a crank 9, which has a crank pin 10. The crank shaft 8 may, if desired, have a plurality of cranks 9, all being located in the same plane. The crank pin 10 is connected with two connecting rods 11, which, in turn, are linked to the piston-like bodies 12, adapted to move in the lower portion of the cylinder 1. The piston-like bodies 12 are connected each by a piston rod 13 with the associated compression piston 5. Each of the cylinders 1 has a partition 14. In the unit A, between said partition 14 and the pistonlike body 12, there is formed a closed space 15, which is filled with fluid and the volume of which varies during the movement of the piston-like body 12. In the other unit B, between the partition 14 and the lower side of the compression piston 5, there is formed a closed space 16, which is also completely filled with fluid. The volume of the space 16 varies during the movement of the compression piston 5. In the unit A a closed space 17 is provided above the expansion piston 6, said space being completely filled with fluid. In the unit B, above the expansion piston 6, there is provided a space 18, which is also filled with fluid. The space 15 of the unit A communicates through a duct 19 with the space 18 of the unit B. The space 16 of the unit B communicates through a duct 20 with the space 17 of the unit A.

The cold-gas refrigerator operates as follows: The crank shaft is driven in the direction of the arrow by the driving gear (not shown). Thus, by means of the crank 9 and the connecting rods 11, the piston-like bodies 12 are moved with a phase difference of about 90°. The movements of the piston-like bodies 12 are transferred through the piston rod 13 to the compression piston 5 of each of the units A and B. The piston-like body 12 of the unit A varies the volume of the fluid-filled space 15. In accordance with the direction of movement of the piston-like body 12 fluid is passed out of the space 15 towards the space 18 or conversely, so that the expansion piston 6 is moved. The volume of the space 16 in the unit B is thus varied by the lower side of the compression piston 5 of the unit B. Fluid is thus conducted towards the space 17 of the unit A or away therefrom, so that in addition the expansion piston 6 of the unit A is set into motion. The correct phase difference between the compression piston and the expansion piston of the unit B is obtained by the fact that the volume variations of the space 15 are in co-phase with the volume variations of the compression space of the unit A. The correct phase difference between the compression piston and the expansion piston of the unit A is furthermore ensured by the correct phase opposition of the volume variations of the space 16 to the volume variations of the compression space of the unit B.

Figure 2:
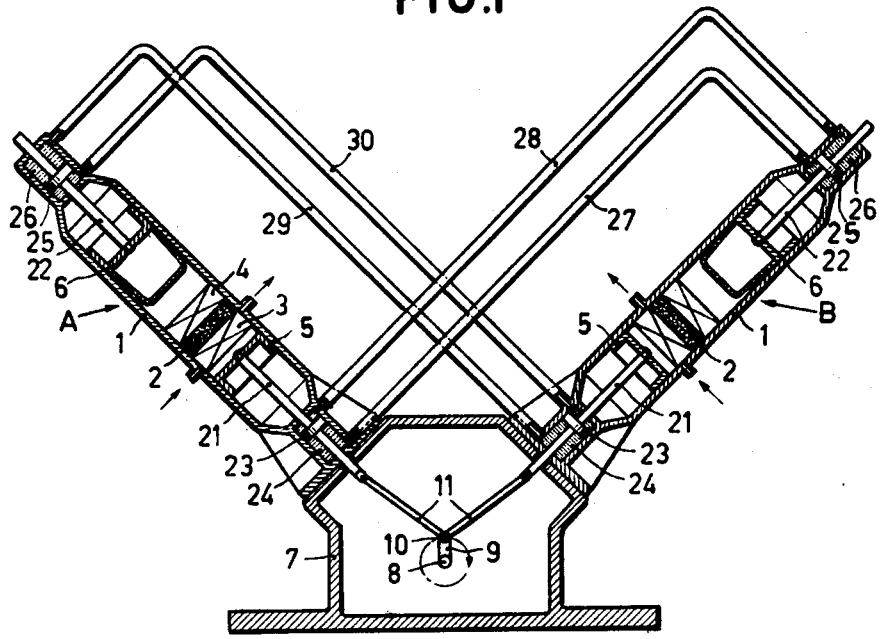

FIG. 2 shows a cold-gas refrigerator, which is in general similar to that of FIG. 1. The difference is, however, that in this embodiment both the compression piston 5 and the expansion piston 6 are provided on their sides remote from the working space with a piston rod 21 and 33 respectively. The piston rod 21, connected with the compression piston 5 of each unit, is provided with a piston-like body 23. This piston-like body 23 is adapted to move in a closed cylinder 24, the spaces on either side of the piston 23 being filled with fluid. As in FIG. 1, the piston rod 21 is connected by the connecting rod 11 with the crank pin 10 of the crank shaft 8. The piston rod 22, connected with the expansion piston 6 of each unit, supports also a piston-like body 25. This piston-like body 25 is movable in a closed cylinder 26, while the spaces on either side of the piston 25 are filled with fluid. The spaces on either side of the piston-like body 23 in the cylinder 24 of the unit A communicate through ducts 27 and 28 with the spaces on either side of the piston-like body 25 in the cylinder 26 of the unit B. The spaces beneath and above the piston-like body 23 in the cylinder 24 of the unit B communicate via ducts 29 and 30 with the spaces above and beneath the piston 25 respectively in the cylinder 26 of the unit A. By "crossing" the ducts 29 and 30, the correct phase difference between the compression piston and the expansion piston of each unit is ensured.

This embodiment has a further advantage in that the diameters of the piston-like bodies 23 and 25 may be smaller than the diameters of the compression piston and the expansion piston. Thus, in this embodiment, the various fluid-filled spaces may be smaller than in the embodiment of the cold-gas refrigerator shown in FIG. 1, so that smaller quantities of fluid will suffice in the machine.

Figure 3:
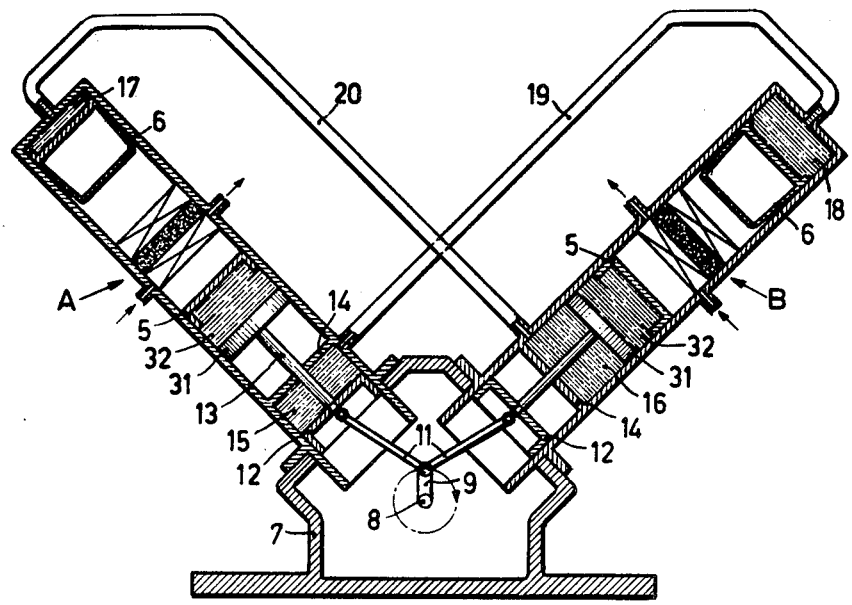

Although in the embodiments of the hot-gas reciprocating machine according to the invention described above the piston-like body bounding the space having the lower mean temperature is coupled via connecting rods with the driving gear, it is also possible to couple the piston-like bodies of each unit through a movable fluid column with the driving gear. This is illustrated diagrammatically in the embodiment of FIG. 3. In this case, the crank shaft 8 is coupled by means of connecting rods 11 with the piston-like bodies 12. The piston-like bodies 12 of each unit are linked through a piston rod 13 to a piston-like body 31. Between the piston-like body 31 and the compression pistons 5 of each unit there is a movable fluid column 32. Thus, the movement of the piston-like body 31 is transferred through the fluid column 32 to the compression piston 5. The cylinder 1 of each unit again comprises a partition 14. Between the partition 14 and the piston-like body 12 of the unit A there is a closed, fluid filled space 15, the volume of which is varied during the movement of the piston-like body 12. The unit B comprises, between the lower side of the piston-like body 31 and the partition 14, the fluid-filled space 16, the volume of which is varied during the movement of the piston-like body 31. The space 15 of the unit A communicates through a duct 19 with a space 18 for the expansion piston 6 of the unit B. The space 16 of the unit B communicates through a duct 20 with the space 17 above the expansion piston 6 of the unit A.

With all these embodiments of the cold-gas refrigerator the pressure in the cycle space ensures that the piston-like bodies are constantly urged against the movable fluid column.

Although in FIGS. 1 and 2 for clarity purposes the compression piston is illustrated as mechanically coupled with the driving gear, it will be obvious that in the case of a hot-gas engine the expansion piston will preferably be coupled with the driving gear, since in this case the greater power is guided by the expansion piston.

Figure 4:
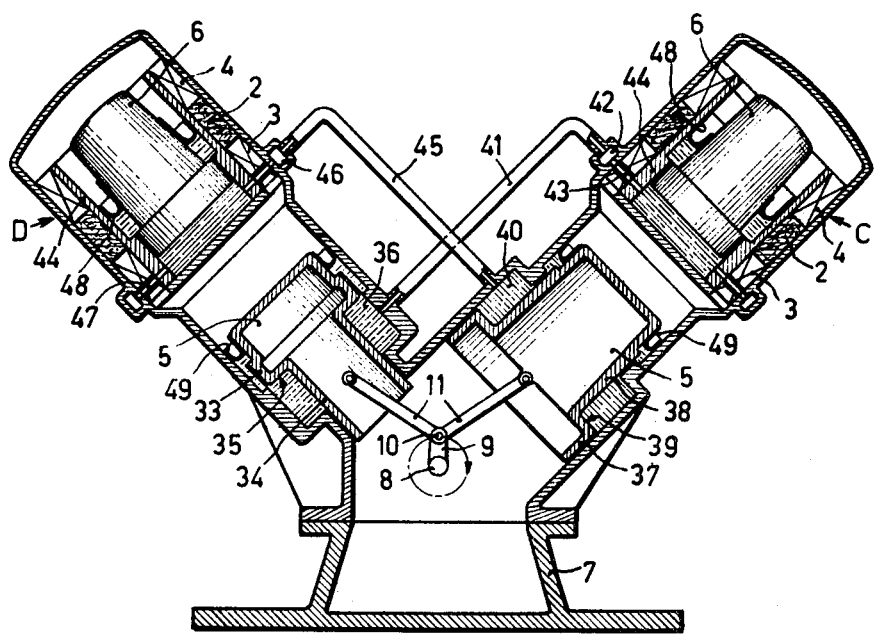
FIG. 4 is a part sectional and a part side elevational view of a further embodiment of the hot-gas reciprocating machine.

FIG. 4 shows an embodiment of a cold-gas refrigerator comprising two units C and D arranged in the form of a V on a substructure of a machine. Each of the units C and D comprises a compression piston 5, an expansion piston 6, a regenerator 2, a cooler 3 and a freezer 4. The compression pistons 5 of each of the units are connected via connecting rods 11 with the crank pin 10 of the crank shaft 8. Also in this case the crank shaft 8 can be driven in the direction of the arrow by a driving gear (not shown). The crank shaft 8 is again housed in the machine frame 7. The compression piston 5 of the unit D has a portion 33, which has a larger diameter than the portion 34. Thus, an annular surface 35 is formed, which varies the volume of the fluid-filled space 36, when the compression piston 5 moves. The compression piston 5 of the unit C has a portion 37, having a larger diameter than the portion 38. Thus, an annular surface 39 is formed, which varies the volume of the fluid-filled space 40. It is remarkable in this case that the volume of the space 36, due to the disposition of the annular surface 35, and the volume of the space 40, and due to the disposition of the annular surface 39, are varied in opposite directions with a movement of the compression pistons in the same direction. The space 36 communicates through a duct 41 with an annular duct 42, which surrounds the unit C. The annular duct 42 communicates through ducts 43 with the space in the cylinder 44 of the unit C beneath the expansion piston 6. The space 40 communicates through a duct 45 with the annular duct 46 of the unit D. The annular duct 46 communicates through ducts 47 with the space in the cylinder 44 below the expansion piston 6 of the unit D. The seal between the fluid spaces in this cold-gas refrigerator and the working space is obtained by arranging rolling diaphragm 48 and 49 between the compression piston 5, the expansion piston 6 and the surrounding cylinder portions respectively. This provides a complete fluid seal, so that there is no risk of the fluid entering the working space. It will be obvious that these rolling-diaphragm seals may also be advantageously employed in the cold-gas refrigerator shown in FIGS. 1, 2 and 3. For the sake of clarity they are not shown in said figures.

In accordance with the invention a simple and compact structure of a hot-gas reciprocating machine is obtained without the need for using complicated driving gears and other complicated structures.

I claim:

1. A hot-gas reciprocating apparatus comprising at least one cylinder, at least two piston-like bodies mounted for reciprocating movement with a predetermined phase difference in said cylinder forming in the latter at least one compression space and at least one expansion space, a medium in said compression space and said expansion space, a closed space adjacent to each piston-like body, a transferable fluid in said closed spaces, said compression and expansion spaces upon operation of said apparatus having relatively different mean temperatures, means interconnecting said compression and expansion spaces including a regenerator through which said medium traverses, said piston-like bodies reciprocating with said phase difference in order to vary the volume of the expansion space and the compression space, a driving gear coupled to one of said piston-like bodies, said piston-like bodies being connected by ducts enclosing fluid columns from said closed spaces moving in said ducts so that power can be transferred by said fluid columns from said driving gear to at least one of the associated piston-like bodies and vice versa.

2. A hot-gas reciprocating apparatus as claimed in claim 1 wherein said piston-like body capable of varying the volume of the space having the higher mean temperature in operation is connected mechanically with said driving gear while the piston-like body capable of varying the volume of the space having a lower mean temperature is connected through a movable fluid column with said driving gear.

3. A hot gas reciprocating apparatus as claimed in claim 1 wherein the center lines of said two piston-like bodies coincide, and said compression and expansion spaces and regenerator being located between opposite faces of said piston-like bodies, said piston-like body bounding the space having the lower mean temperature having at least one face adjacent to said fluid column, said column forming the coupling between said piston-like body and the driving gear.

4. A hot-gas reciprocating apparatus as claimed in claim 1 wherein the center lines of said two piston-like bodies coincide, and said compression and expansion spaces and regenerator being located between opposite faces of said piston-like bodies, said piston-like body bounding the space having the lower mean temperature having a face remote from said space adjacent to said movable fluid column thereby establishing a coupling between said piston-like body and said driving gear.

5. A hot-gas reciprocating apparatus as claimed in claim 3 wherein said piston-like body bounding the space having the lower mean temperature is provided on its side remote from said space with a piston rod supporting another piston-like body of the double-acting type, each of the faces of said double-acting piston being adjacent to a fluid column which establishes the coupling between said double-acting piston and the driving gear.

6. A hot-gas reciprocating apparatus comprising a pair of cylinders forming two pump units, each unit including at least one piston mounted for reciprocation in its cylinder, means for interconnecting said pistons, a driving gear coupled to said piston-like bodies, each of said pistons being adapted to vary the volume of a liquid filled space, and the apparatus further includes at least one unit in which a thermo-dynamic cycle is performed and which includes a compression piston adapted to move in its corresponding cylinder, a cooler, a regenerator, a freezer and an expansion piston adapted to move in its corresponding cylinder, the parts of each unit being in line with each other, and the space of each unit positioned on the side of the expansion piston remote from the working space communicating with a space acted upon by a piston of said first pump unit, and the space positioned on the side of the compression piston remote from said working space communicating with a space acted upon by a piston of said second pump unit.

7. A hot gas reciprocating apparatus as claimed in claim 6 wherein the center lines of said pump units are arranged in the form of a V at an angle of about 90°, and the pistons of said pump units are linked mechanically to the same cranks of a common crank shaft extending substantially in the same plane.

8. A hot-gas reciprocating apparatus comprising a pair of cylinders forming two pump units, at least two piston-like bodies mounted for reciprocating movement with a predetermined phase difference in each of said cylinders forming in each cylinder at least one compression space and at least one expansion space, a transferable medium in said spaces, said spaces upon operation of said apparatus having relatively different mean temperatures, means interconnecting said compression and expansion spaces in said cylinders including a regenerator in each cylinder through which said medium traverses, said piston-like bodies reciprocating with said phase difference in order to varry the volume of the expansion space and the compression space, a driving gear coupled to said piston-like bodies, said coupling with at least one of said bodies being ducts enclosing fluid columns moving in said ducts so that power can be transferred by said fluid columns from said driving gear to the associated piston-like body and vice versa, the piston bounding the space of higher mean temperature being mechanically coupled to a crank shaft, a further piston-like body being mechanically linked to said crank shaft whereby said pistons are adapted to move with a certain phase difference, at least one space on one side of said further piston-like body being filled with fluid, the piston-like body bounding the space with the lower mean temperature also being connected to a further piston-like body at least one space adjacent to said further piston-like body being completely filled with fluid, and means connecting said fluid-filled spaces on either side of said further piston-like bodies whereby they communicate with one another.

9. A hot gas reciprocating apparatus as claimed in claim 8 comprising two units, in which the thermodynamic cycle is performed, arranged in the form of a V including each two piston-like bodies which are a compression piston and an expansion piston respectively, said associated compression space, regenerator space and expansion space being located between said pistons, each compression and expansion piston being connected with a piston-like body adapted to move in a closed cylinder, the spaces on either side of said other piston-like bodies being filled with fluid, each of the fluid-filled spaces on either side of said other piston-like bodies being connected with one of the pistons bounding the space having the higher mean temperature communicates with one of the fluid-filled spaces on either side of said piston-like body connected with the piston bounding the space having the lower mean temperature.

10. A hot-gas reciprocating apparatus comprising two cylinders, at least two piston-like bodies mounted for reciprocating movement with a predetermined phase difference, said cylinders forming a V-shaped structure, each of said cylinders including a reciprocating compression piston and a reciprocating expansion piston with a predetermined phase difference, the center lines of associated pistons having coinciding center lines, each of said cylinders having at least one compression space and at least one expansion space, a transferable medium in said spaces, said spaces upon operation of said apparatus having relatively different mean temperatures, means interconnecting said compression and expansion spaces including a regenerator through which said medium traverses, said piston-like bodies reciprocating with said phase difference in order to vary the volume of the expansion space and the compression space, a driving gear coupled to said piston-like bodies, said coupling with at least one of said bodies being ducts enclosing fluid columns moving in said ducts so that power can be transferred by said fluid columns from said driving gear to the associated piston-like body and vice versa, the piston associated with the space of higher mean temperature having two portions of different cross-sectional diameters, said portions being adapted to reciprocate in the associated cylinder space and in that the volume variations of the space acted upon by said annular surface formed by the transition between the two portions of one piston associated with the space of the higher mean temperature being in co-phase with the volume variations of the space having the higher mean temperature, while the volume variations of the space acted upon by the annular surface formed by said transition between the two portions of the other piston associated with the space of higher mean temperature are in phase opposition to the volume variations of the space having the higher mean temperature, the spaces acted upon by said annular surface being completely filled with fluid and each of said spaces communicating with a cylinder space closed at its upper end by a piston having in operation a lower mean temperature in the other cylinder.

11. A hot-gas reciprocating apparatus as claimed in claim 6 wherein the seal between the fluid columns in the apparatus and the expansion space and compression space, respectively, is a rolling flexible diaphragm.

References Cited by the Examiner

UNITED STATES PATENTS 2,484,392  10/49  Heeckeren _____ 62—6
3,078,683   2/63  Dros _____ 62—6

WILLIAM J. WYE, *Primary Examiner.*

ROBERT A. O'LEARY, *Examiner.*